United States Patent
Liu et al.

(10) Patent No.: US 8,130,290 B2
(45) Date of Patent: Mar. 6, 2012

(54) BLACK LEVEL COMPENSATION CIRCUIT

(75) Inventors: Chih-Min Liu, Tainan (TW); Boh-Shun Chiu, Tainan (TW); Ping-Hung Yin, Tainan (TW)

(73) Assignee: Himax Imaging, Inc., Grand Cayman (KY)

( * ) Notice: Subject to any disclaimer, the term of this patent is extended or adjusted under 35 U.S.C. 154(b) by 407 days.

(21) Appl. No.: 12/477,899

(22) Filed: Jun. 3, 2009

(65) Prior Publication Data

US 2010/0309341 A1 Dec. 9, 2010

(51) Int. Cl.
*H04N 9/64* (2006.01)
*H04N 5/217* (2006.01)
(52) U.S. Cl. ........................ 348/243; 348/241
(58) Field of Classification Search .................. 348/241, 348/243
See application file for complete search history.

(56) References Cited

U.S. PATENT DOCUMENTS

| | | | | | |
|---|---|---|---|---|---|
| 4,376,288 | A | * | 3/1983 | Shanley et al. | 348/673 |
| 4,386,370 | A | * | 5/1983 | Harwood et al. | 348/625 |
| 4,742,392 | A | * | 5/1988 | Hashimoto | 348/695 |
| 4,764,816 | A | * | 8/1988 | Heitmann | 386/230 |
| 6,005,615 | A | * | 12/1999 | Tsuda | 348/243 |
| 6,018,364 | A | * | 1/2000 | Mangelsdorf | 348/241 |
| 6,587,144 | B1 | * | 7/2003 | Kim | 348/241 |
| 6,940,548 | B2 | * | 9/2005 | Ying et al. | 348/241 |
| 2008/0218609 | A1 | * | 9/2008 | Blanquart et al. | 348/243 |

* cited by examiner

*Primary Examiner* — Jordan Schwartz
(74) *Attorney, Agent, or Firm* — Stout, Uxa, Buyan & Mullins, LLP (57) ABSTRACT

A black level compensation (BLC) circuit is disclosed. The BLC circuit includes a switched-capacitor (SC) integrator configured to compensate a readout amplifier of an image sensor. An output of the readout amplifier is clamped to a reference voltage at which a black level of the image sensor is defined. According to one aspect, a bad pixel detector is used to detect a bad pixel or pixels and disconnect the BLC loop when the bad pixel or pixels are detected.

16 Claims, 7 Drawing Sheets

BLACK LEVEL COMPENSATION CIRCUIT

BACKGROUND OF THE INVENTION

1. Field of the Invention

The present invention generally relates to black level compensation (BLC) for an image sensor, and more particularly to an analog BLC circuit for an image sensor.

2. Description of the Prior Art

Semiconductor based image sensors such as charge-coupled devices (CCDs) or complementary metal-oxide-semiconductor (CMOS) sensors are widely used, for example, in cameras and camcorders, to convert images of visible light into electronic signals that can be stored, transmitted or displayed.

Due to imperfections in electronic circuitry, leakage current exists even when no light is received by the image sensor. In order to overcome this problem, signals (optical black signals) from rows of optically black (or light-shielded) pixels are read from a programmable gain amplifier (PGA) and then averaged as a base reference for the black color to facilitate compensation of the optical black signals. This base reference, however, may vary due to different gain settings in the PGA.

Figure 1:
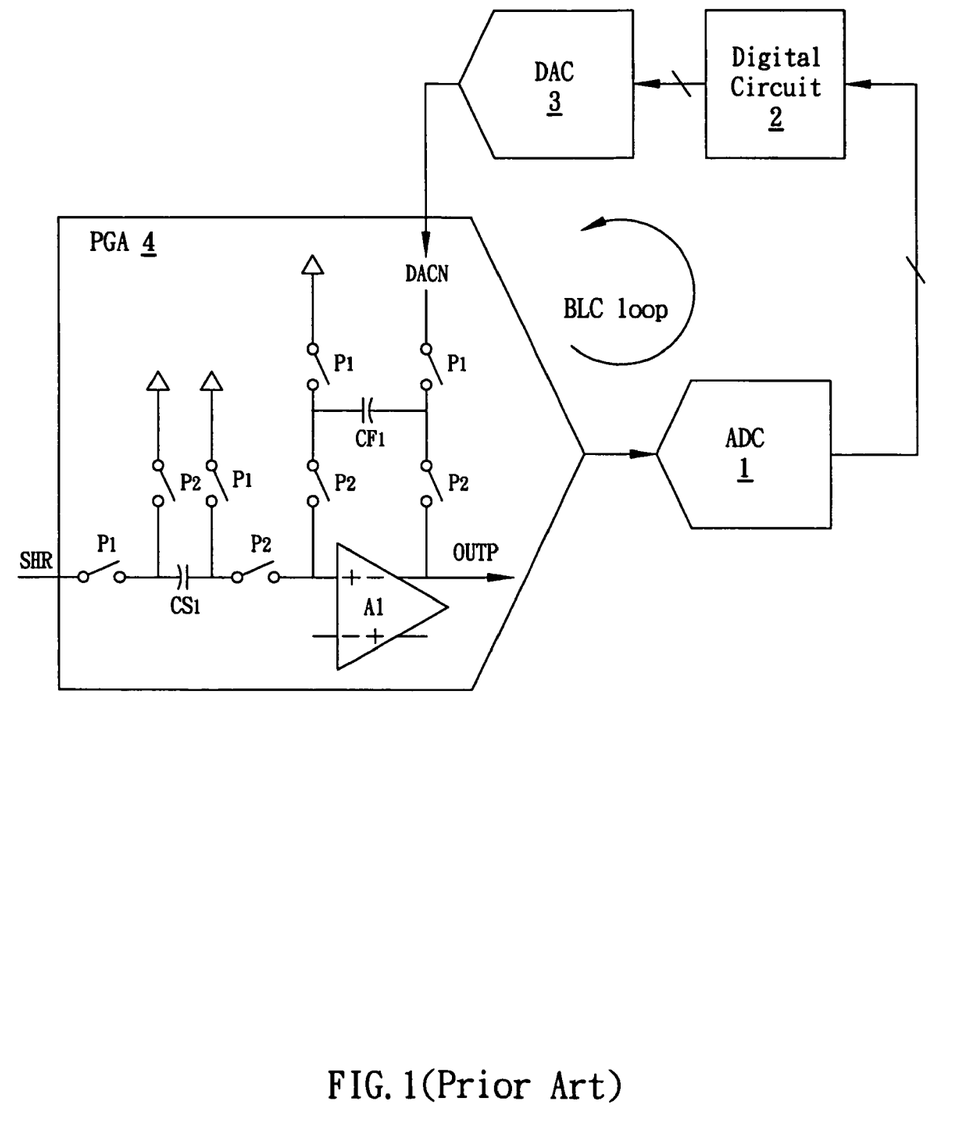
FIG. 1 shows a conventional black level compensation (BLC) system.

FIG. 1 shows a conventional black level compensation (BLC) system, which includes a digital loop made of an analog-to-digital converter (ADC) 1, a digital circuit 2 and a digital-to-analog converter (DAC) 3. Specifically, compensation for optical black signals of the image sensor begins with the ADC 1 receiving optical black signals from the PGA 4, and accordingly outputting their digital equivalents. The digitized optical black signals are then compared and averaged by the digital circuit 2 to generate an averaged signal. The averaged signal is then converted back to its analog equivalent, which is then used to compensate the PGA 4. The ADC 1 and the digital circuit 2 incur latency, and the DAC 3 is subject to quantization errors, thus attenuating the speed and accuracy of the conventional BLC system.

For the reason that a conventional BLC system, particularly a digital-loop BLC such as described above, cannot speedily and accurately compensate the black level for the image sensor, a need has arisen to propose a novel scheme for rapidly and accurately performing BLC.

SUMMARY OF THE INVENTION

In view of the foregoing, an object of the present invention is to provide an analog black level compensation (BLC) circuit for quickly and accurately performing BLC. It is another object of the present invention to substantially save chip area and power consumption.

According to one embodiment, the BLC circuit includes a switched-capacitor (SC) integrator configured to compensate (e.g., with a compensation voltage) a readout amplifier of an image sensor. The SC integrator includes a compensation amplifier (e.g., a differential amplifier), a feedback capacitor, an input capacitor and a plurality of phase-1/phase-2 switches.

Specifically, the input of the compensation amplifier is connected to an output of the readout amplifier. The feedback capacitor is connected between an input and an output of the compensation amplifier, and the input capacitor is controllably connected between an input of the BLC circuit and the input of the compensation amplifier. The phase-1/phase-2 switches are configured in a manner such that charge difference due to a reference voltage and due to the output of the readout amplifier is integrated. Another output of the compensation amplifier provides the compensation voltage to compensate the readout amplifier. As a result, the output of the readout amplifier is clamped to the reference voltage at which a black level of the image sensor is defined.

According to an aspect of the present invention a bad pixel detector is used to detect a bad (or hot) pixel or pixels of optically black pixels, which are being or have been read. The detected bad pixels are blocked from being integrated into/by the SC integrator.

DETAILED DESCRIPTION OF THE INVENTION

Figure 2:
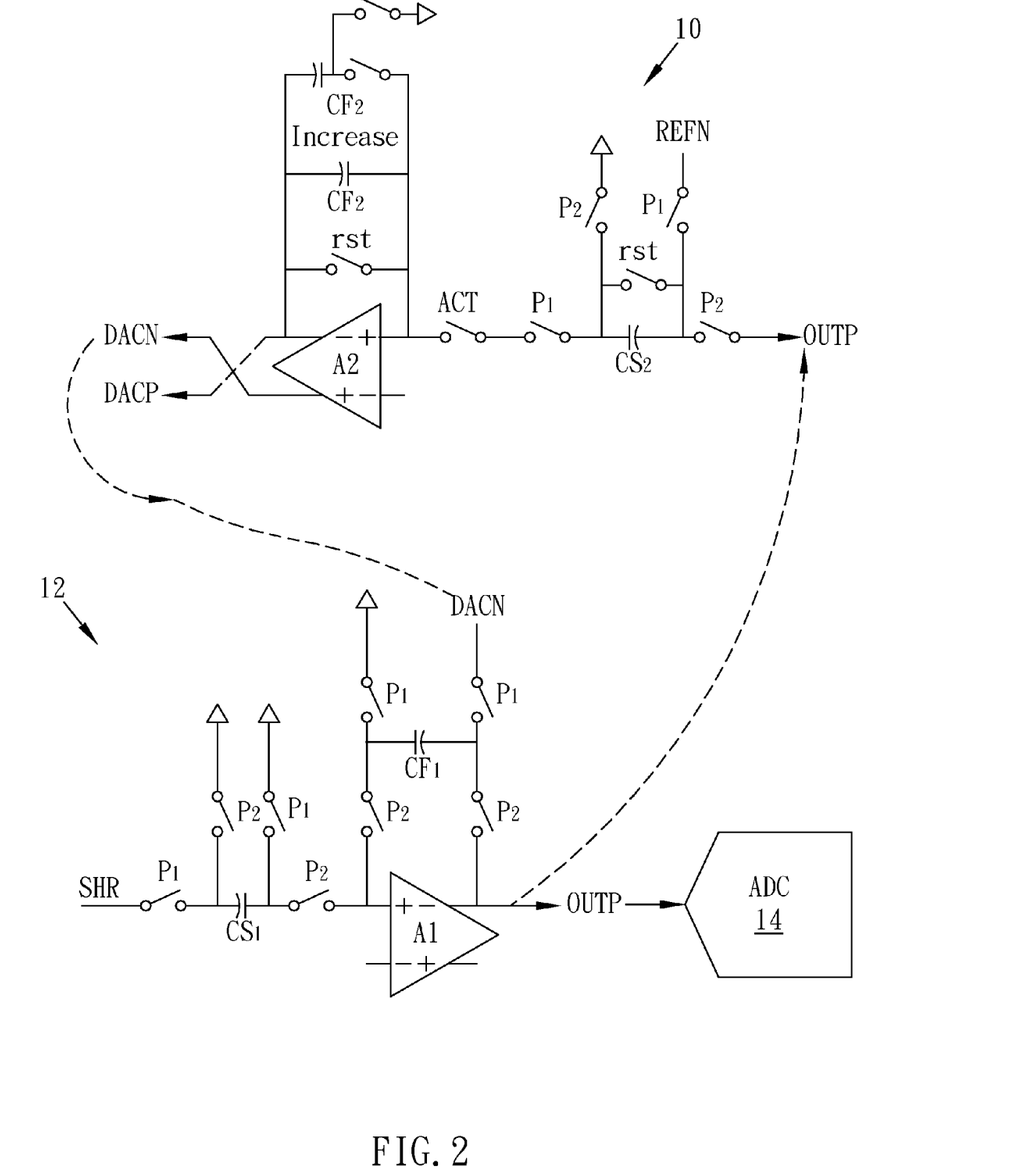
FIG. 2 shows a BLC circuit coupled to a readout amplifier according to a first embodiment of the present invention.

FIG. 2 shows a black level compensation (BLC) circuit, which is configured as a switched-capacitor (SC) integrator 10 and which is coupled to a readout amplifier according to a first embodiment of the present invention. The BLC circuit 10 is used to compensate the readout amplifier, which comprises, for example, a programmable gain amplifier (PGA) 12 that amplifies signals obtained from an image sensor (not shown). An (open-loop) analog-to-digital converter (ADC) 14 receives the output of the PGA 12. In the embodiment, the output OUTP of the PGA 12 is connected to the input of the BLC circuit 10, and the (positive) output DACN of the BLC circuit 10 is controllably connected to charge a feedback capacitor CF1 or an input capacitor CS1 of the PGA 12, thereby forming a BLC loop, which is an analog loop rather than the digital loop used by the conventional BLC system (FIG. 1).

In the embodiment, the SC integrator 10 includes a compensation amplifier (e.g., a fully differential amplifier, which is referred to not by way of limitation as a compensation amplifier) A2, a feedback capacitor CF2, an input capacitor CS2, and phase 1/phase 2 switches P1/P2. The feedback capacitor CF2 is connected between the positive input and the negative output of the compensation amplifier A2. The input capacitor CS2 is connected, via switches P1/P2, between the input of the BLC circuit 10 and the positive input of the compensation amplifier A2. The positive output of the compensation amplifier A2 provides the compensation voltage DACN to the PGA 12.

Figure 3:
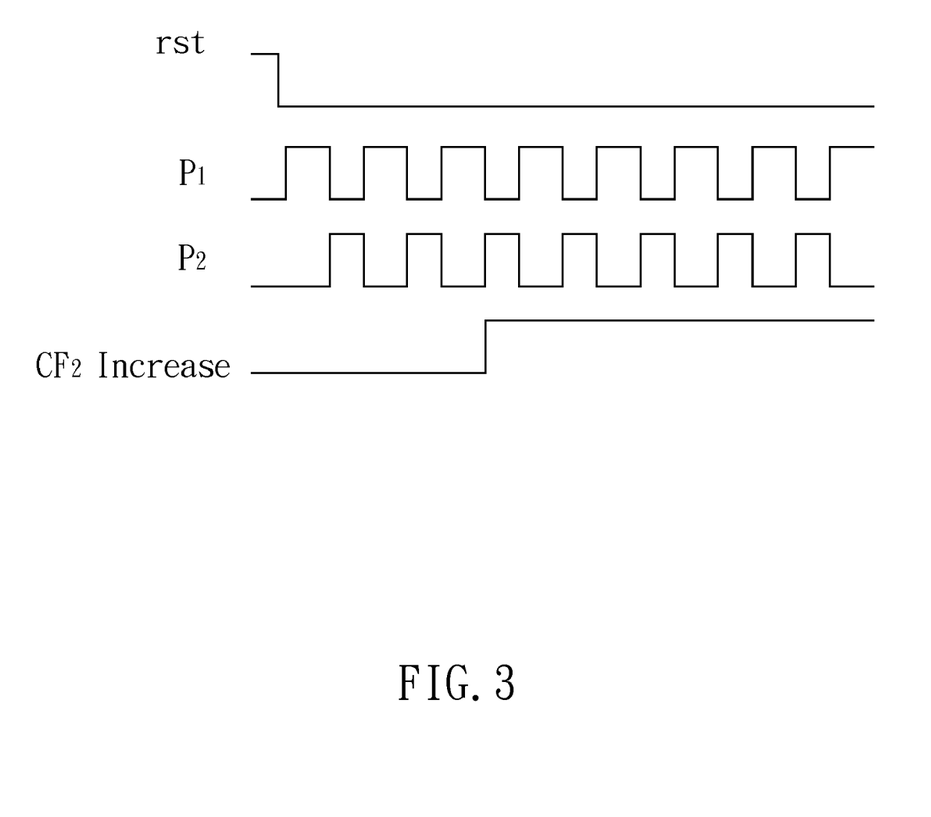
FIG. 3 shows a timing diagram illustrating non-overlapping phase signals P1 and P2.

FIG. 3 is a timing diagram illustrating non-overlapping phase signals P1/P2 and signals from the implementation of FIG. 2. During the first phase P1, charge is stored on the input capacitor CS2 due to the negative reference voltage REFN, which is the zero level of the ADC 14 at which a black level of the image sensor is defined. During the second phase P2, charge is stored on the input capacitor CS2 due to the output voltage OUTP of the PGA 12. The charge difference due to REFN and OUTP is then transferred to the feedback capacitor CF2, or, in other words, the difference between OUTP and REFN is integrated by the SC integrator 10. As a result, the output voltage OUTP of the PGA 12 is clamped to the negative reference voltage REFN, thus completing the BLC. It is appreciated that, in another embodiment, the output voltage OUTP of the PGA 12 may be clamped to a non-zero defined black level. For example, the output voltage OUTP of the PGA 12 may be clamped to the 90% REFN if the optical black level is defined at the level of the ADC 14.

In practice, the capacitance of the feedback capacitor CF2 is designed to be substantially the same as the capacitance of the input capacitor CS2, such that the BLC loop can settle fast (usually in only a few clock cycles) while reading optical black signals (corresponding to optically black or light-shielded pixels) with the closing of switch ACT of the SC integrator 10. Subsequently, the capacitance of the feedback capacitor CF2 substantially increases (FIG. 3) by controllably coupling another capacitor (CF2 increase) in parallel with CF2. The increased feedback capacitance makes the BLC circuit 10 more resistant to bad (unwanted or hot) pixels. Accordingly, an accurate and high-speed BLC circuit 10 can be attained. The switch ACT is then opened after completion of the BLC. The switch ACT may be opened when one or more bad pixels are detected, thereby eliminating any adverse effects which may be caused by the bad pixels.

Compared to the conventional BLC system of FIG. 1, the embodiment of the present invention utilizes an analog feedback loop to realize BLC, and therefore the digital circuit 2 (FIG. 1) and the DAC 3 (FIG. 1) are no longer needed, thereby eliminating the incurred latency and quantization error. Furthermore, substantial chip area and associated power consumption are saved.

Figure 4:
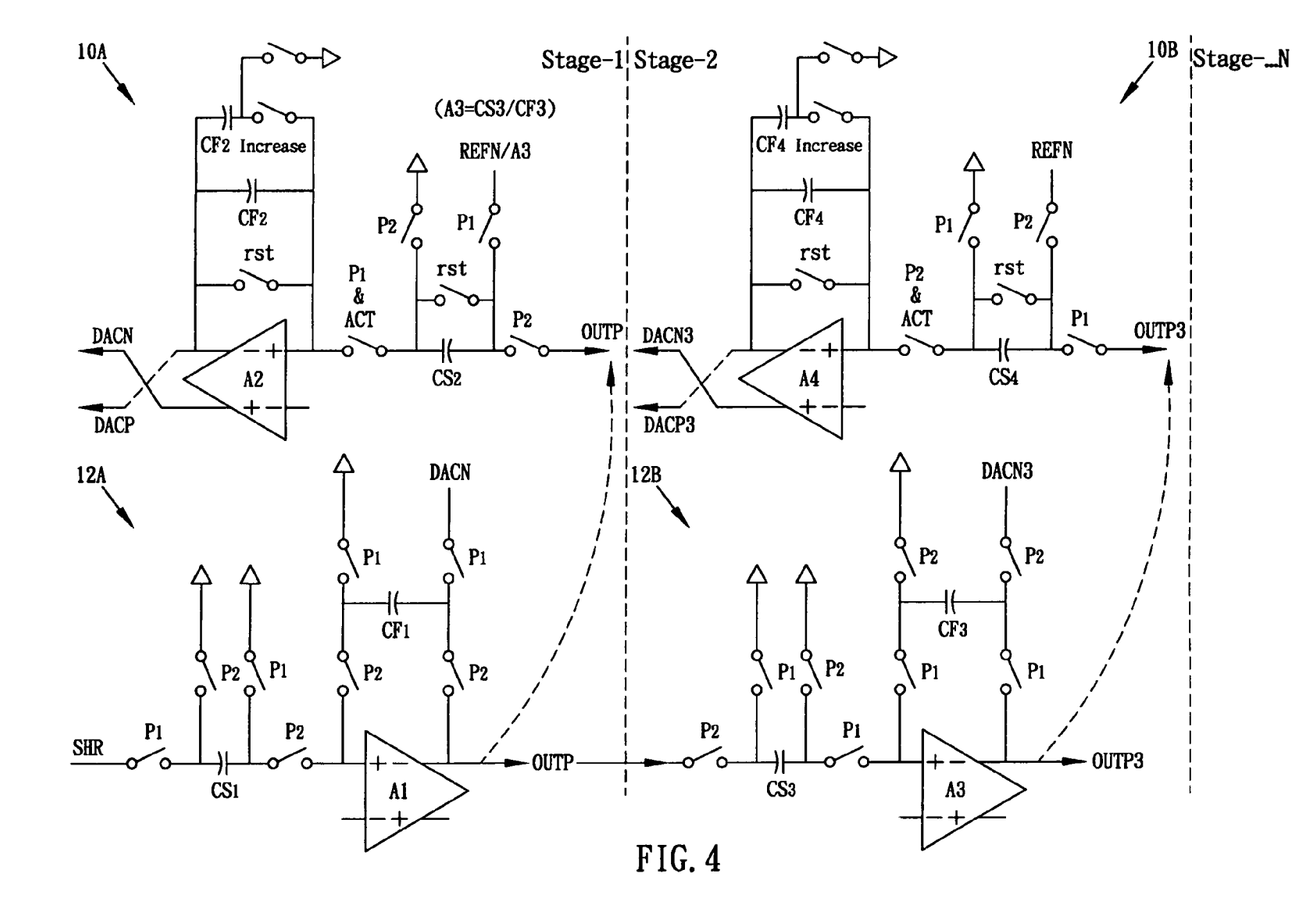
FIG. 4 shows a BLC circuit according to a second embodiment of the present invention.

FIG. 4 shows a BLC circuit 10A/10B according to a second embodiment of the present invention. In the embodiment, a multi-stage (for example, two-stage) PGA 12A/12B is applied. There is one BLC circuit corresponding to each PGA stage. For example, in one exemplary embodiment, the BLC circuit 10A is used to clamp the output of the PGA 12A, and the BLC circuit 10B is used to clamp the output of the PGA 12B. In another exemplary embodiment, however, only the final PGA stage is clamped while other stage or stages are ignored.

In the second embodiment (FIG. 4), the output voltage OUTP3 of the second-stage PGA 12B is clamped to the negative reference voltage REFN, and the output voltage OUTP of the first-stage PGA 12A is clamped to the voltage REFN/A3 (where A3=CS3/CF3). Generally speaking, the target clamp voltage of each stage is scaled down with the ratio of the gain in the following PGA. For example, as shown in FIG. 4, the PGA gain A3 in the second stage is equal to CS3/CF3, and the target clamp voltage of the first stage is thus equal to REFN/A3.

Figure 5:
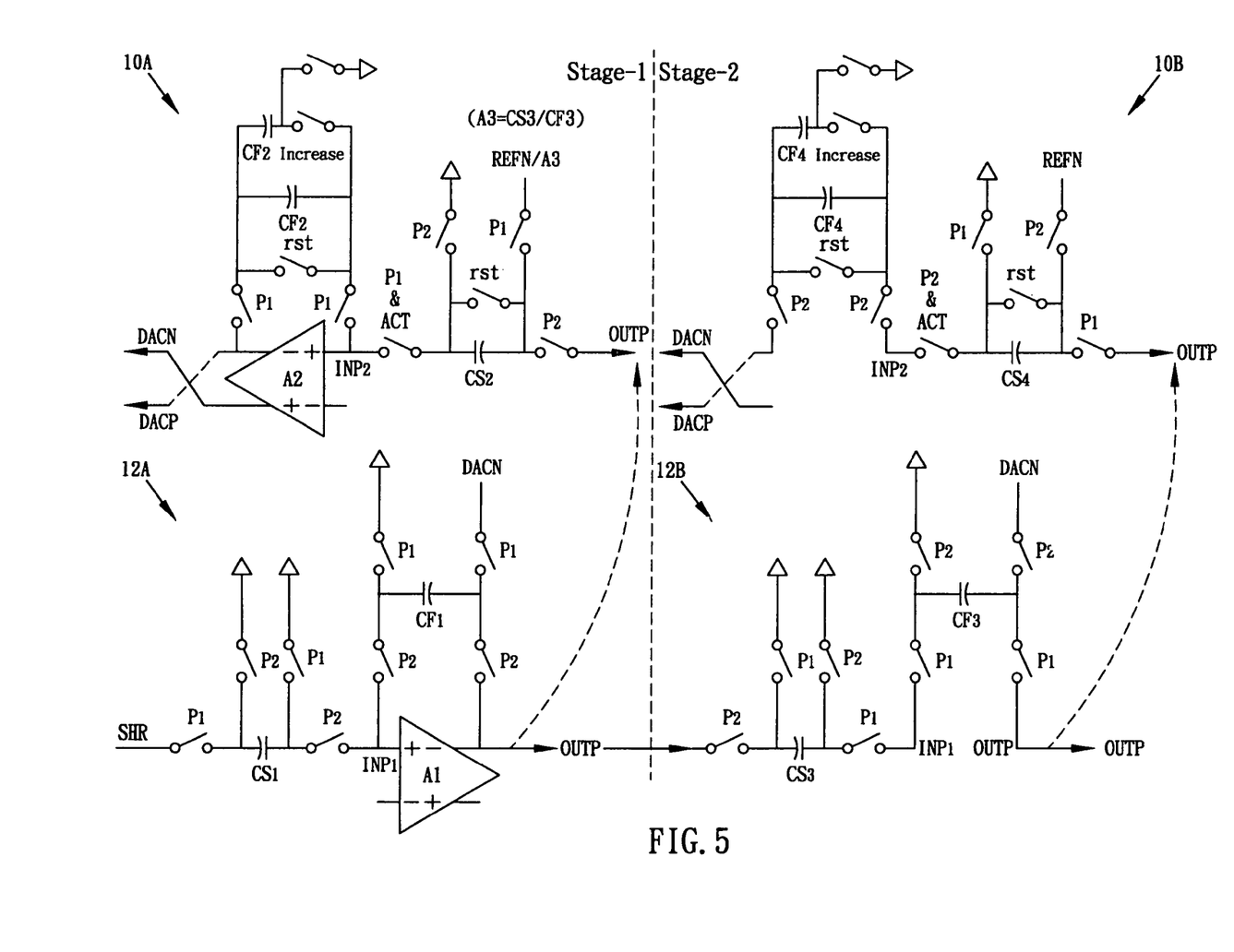
FIG. 5 shows a modified version of the second embodiment depicted in FIG. 4.

It is noted that, in the multi-stage embodiment of FIG. 4, the phase switches P1/P2 are alternated between the neighboring stages. As each amplifier (A2 or A4) works only half of the time, the neighboring stages may accordingly share one amplifier. As shown in FIG. 5, this embodiment can be a modified version of the second embodiment (FIG. 4), thereby saving more chip area than that of FIG. 4. According to the FIG. 5, the compensation amplifier A2 is configured to be connected to the first-stage BLC circuit 10A during the first phase P1, and the same compensation amplifier A2 is configured to be connected to the second-stage BLC circuit 10B during the second phase P2. Similarly, for the PGA 12A/12B, the compensation amplifier Al is connected to the second-stage PGA 12B during the first phase P1, and the same compensation amplifier A1 is connected to the first-stage PGA 12A during the second phase P2.

Figure 6:
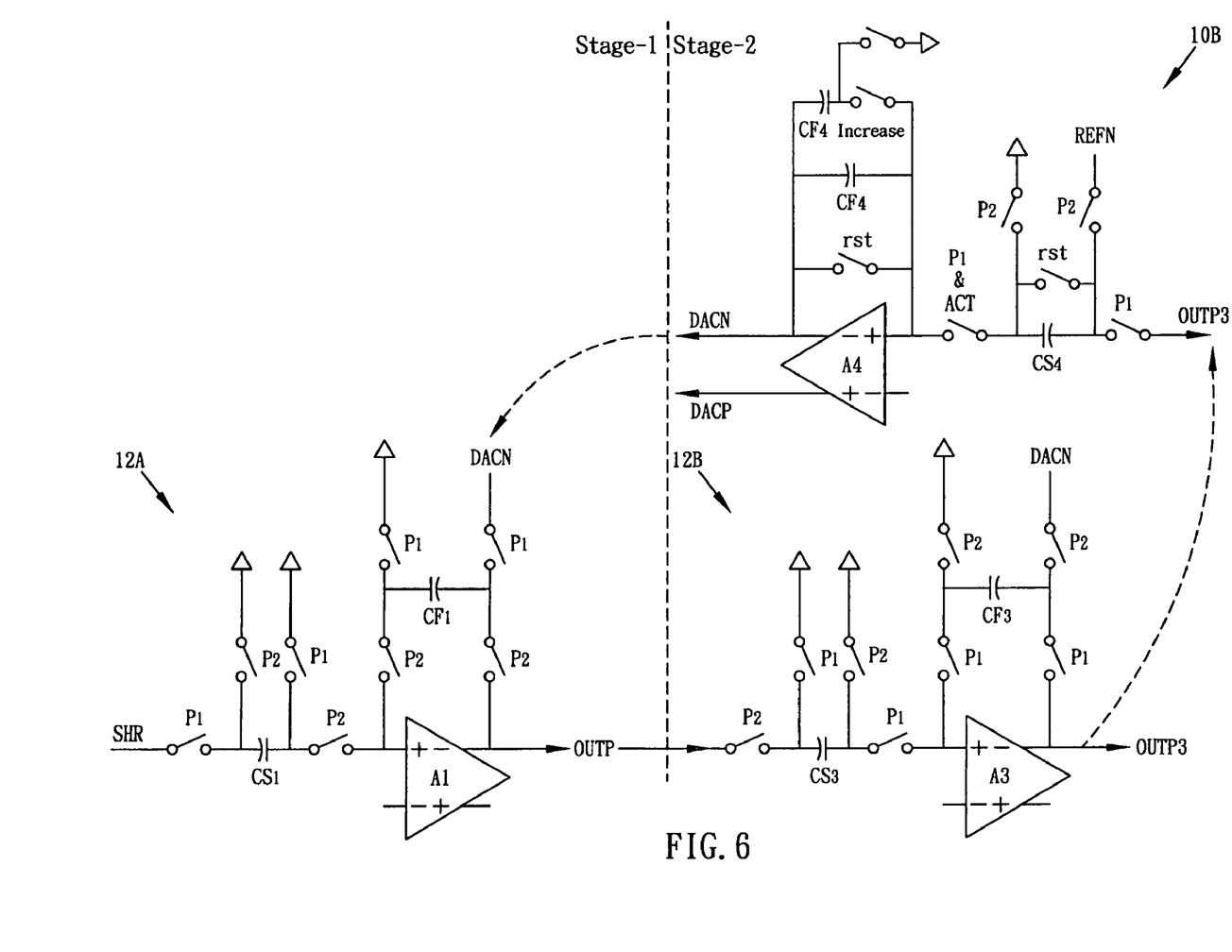
FIG. 6 shows another modified version of the second embodiment depicted in FIG. 4.

FIG. 6 shows another modified version of the second embodiment (FIG. 4). In this modified embodiment, two-stage PGA is applied, while only one stage of BLC circuit 10B is used, thereby saving more chip area and associated power consumption than that in FIG. 4. The single-stage BLC circuit 10B is arranged in an inverting configuration, in which the negative output DACN of the single-stage BLC circuit 10B is connected to compensate the first-stage PGA 12A, while the output OUTP3 of the second-stage PGA 12B is connected to the input of the single-stage BLC circuit 10.

Figure 7:
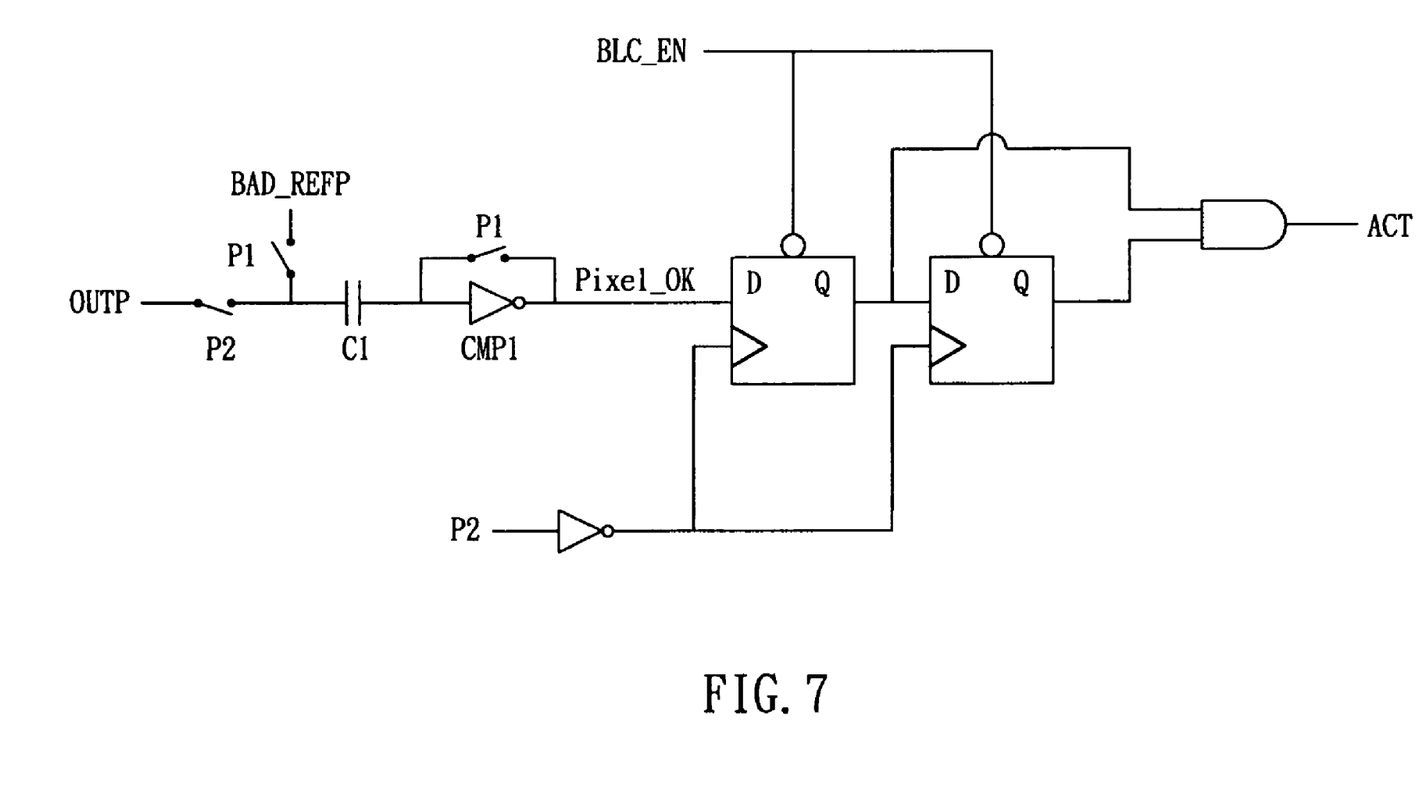
FIG. 7 shows an exemplary bad pixel detector according to an aspect of the present invention.

During integration of the optical black signals, a number of bad-pixel signals may occur due to non-ideal manufacturing. Therefore a bad pixel detector may be applied to control the switch ACT in the BLC circuit to bypass this bad pixel information by disconnecting the BLC loop. FIG. 7 shows an exemplary bad pixel detector according to one aspect of the present invention. An inverter CMP1 and a capacitor C1 serve as a comparator to compare the output OUTP level of the PGA 12 (e.g., in FIG. 2) with a defined bad-pixel reference BAD_REFP. When the output OUTP is greater than the bad pixel reference BAD_REFP, the comparator's output Pixel_OK becomes "0" and the detector output ACT becomes "0," which is then used to bypass the bad-pixel information. The detector as disclosed may be modified or substituted by other circuits having equivalent function.

Although specific embodiments have been illustrated and described, it will be appreciated by those skilled in the art that various modifications may be made without departing from the scope of the present invention, which is intended to be limited solely by the appended claims.

What is claimed is:
1. A black level compensation (BLC) circuit, comprising:
 a switched-capacitor (SC) integrator configured to compensate a readout amplifier of an image sensor such that an output of the readout amplifier is clamped to a reference voltage at which a black level of the image sensor is defined;
 wherein the SC integrator comprises:
 a compensation amplifier comprising a differential amplifier;
 a feedback capacitor connected between a positive input and a negative output of the compensation amplifier;
 an input capacitor controllably connected between an input of the BLC circuit and the positive input of the compensation amplifier; and
 a plurality of first-phase switches and second-phase switches, which are configured in a manner such that charge difference due to the reference voltage and due to the output of the readout amplifier is transferred to the feedback capacitor of the BLC circuit;
 wherein a positive output of the compensation amplifier provides a compensation voltage to compensate the readout amplifier; and
 wherein charge is stored on the input capacitor of the BLC circuit due to the reference voltage during the first phase, and another charge is stored on the input capacitor of the BLC circuit due to the output of the readout amplifier during the second phase.

2. The BLC circuit of claim 1, wherein the black level is defined as a negative reference voltage of an analog-to-digital converter (ADC) that is connected to the output of the readout amplifier.

3. The BLC circuit of claim 1, wherein the output of the readout amplifier is connected to an input of the BLC circuit, and an output of the BLC circuit is controllably connected to charge a feedback or input capacitor of the readout amplifier.

4. The BLC circuit of claim 1, wherein a capacitance of the feedback capacitor is substantially the same as a capacitance of the input capacitor, and further comprising circuitry configurable to increase the capacitance of the feedback capacitor.

5. The BLC circuit of claim 4, wherein the circuitry is an additional capacitor that is configured to be coupled in parallel with the feedback capacitor.

6. The BLC circuit of claim 1, wherein the readout amplifier includes a plurality of stages, and the BLC circuit includes a plurality of stages, each corresponding to one stage of the readout amplifier.

7. The BLC circuit of claim 6, wherein each stage of the BLC circuit is used to clamp the corresponding stage of the readout amplifier.

8. The BLC circuit of claim 7, wherein a target clamp voltage of each stage of the BLC circuit is scaled down with a ratio equal to a gain in the following stage of the readout amplifier.

9. The BLC circuit of claim 6, wherein an amplifier is shared between neighboring stages of the BLC circuit such that the shared amplifier is connected to one of the neighboring stages during the first phase, and is then connected to another of the neighboring stages during the second phase.

10. The BLC circuit of claim 1, wherein the readout amplifier includes two stages, and the BLC circuit includes a single stage which is in an inverting configuration, in which negative output of the single-stage BLC circuit is connected to compensate the first-stage readout amplifier, while the output of the second-stage of the readout amplifier is connected to the input of the single-stage BLC circuit.

11. The BLC circuit of claim 1, further comprising a switch that, when open, bypasses bad-pixel information whenever a bad pixel is detected.

12. The BLC circuit of claim 11, further comprising a bad pixel detector for detecting the bad pixel, wherein the bad pixel detector comprises:
a comparator that compares the output of the readout amplifier with a defined bad pixel reference, and bypasses the bad pixel when the output of the readout amplifier is greater than the bad-pixel reference.

13. A black level compensation (BLC) circuit, comprising:
a compensation amplifier, an input of which is connected to an output of a readout amplifier;
a feedback capacitor connected between an input and an output of the compensation amplifier;
an input capacitor controllably connected between an input of the BLC circuit and the input of the compensation amplifier;
a plurality of first-phase switches and second-phase switches, which are configured in a manner such that charge difference due to a reference voltage and due to the output of the readout amplifier is integrated;
a switch that, when open, bypasses bad-pixel information whenever a bad pixel is detected; and
a bad pixel detector for detecting the bad pixel, wherein the bad pixel detector comprises:
a comparator that compares the output of the readout amplifier with a defined bad-pixel reference, and bypasses the bad pixel when the output of the readout amplifier is greater than the bad pixel reference;
wherein another output of the compensation amplifier provides a compensation voltage to compensate the readout amplifier, whereby the output of the readout amplifier is clamped to the reference voltage at which a black level of an image sensor is defined.

14. The BLC circuit of claim 13, wherein the compensation amplifier is a differential amplifier, and the feedback capacitor is connected between a positive input and a negative output of the compensation amplifier.

15. The BLC circuit of claim 14, wherein the compensation voltage is provided by a positive output of the compensation amplifier.

16. The BLC circuit of claim 15, wherein the compensation voltage is controllably connected to charge a feedback capacitor of the readout amplifier.

* * * * *